United States Patent [19]
Langdon et al.

[11] Patent Number: 5,510,890
[45] Date of Patent: Apr. 23, 1996

[54] LASER RADAR WITH REFERENCE BEAM STORAGE

[75] Inventors: Roger M. Langdon, Colchester; Edward L Lewis, Maidstone, both of United Kingdom

[73] Assignee: GEC-Marconi Limited, Middlesex, United Kingdom

[21] Appl. No.: 136,918

[22] Filed: Oct. 18, 1993

[30] Foreign Application Priority Data

Nov. 3, 1992 [GB] United Kingdom ............... 9222955

[51] Int. Cl.⁶ .................................................. G01C 3/08
[52] U.S. Cl. ...................... 356/5.09; 356/5.01; 356/5.14; 356/5.15; 356/349; 356/28.5
[58] Field of Search .......................... 356/28.5, 5, 349, 356/5.15, 5.01, 5.14, 5.09

[56] References Cited

U.S. PATENT DOCUMENTS

| | | | |
|---|---|---|---|
| 3,402,630 | 9/1968 | Blau et al. | |
| 3,811,774 | 5/1974 | Honeycutt et al. | 356/5 |
| 3,950,100 | 4/1976 | Keene et al. | 356/28.5 |
| 4,298,280 | 11/1981 | Harney | 356/5 |
| 4,447,149 | 5/1984 | Marcus et al. | 356/5 |
| 4,521,107 | 6/1985 | Chaborski et al. | |
| 4,655,588 | 4/1987 | Chenausky et al. | 356/5 |
| 4,770,526 | 9/1988 | Manhart et al. | |

FOREIGN PATENT DOCUMENTS

| | | |
|---|---|---|
| 0259699 | 3/1988 | European Pat. Off. |
| 4109844 | 6/1992 | Germany . |
| 2111788 | 7/1983 | United Kingdom . |
| 2147759 | 5/1985 | United Kingdom . |
| 2218588 | 11/1989 | United Kingdom . |

*Primary Examiner*—Stephen C. Buczinski
*Attorney, Agent, or Firm*—Spencer, Frank & Schneider

[57] ABSTRACT

In a laser radar system, in which pulses from a laser are focused by a telescope onto a target, the back-scattered radiation being deflected by polarizing beam splitter onto a detector in conjunction with a reference beam, the reference beam being produced from pulses derived from the pulse laser by the beam splitter, the pulses making repeated journeys around a cavity and a proportion of the pulse being emitted each time so that each input pulse produces a multiplicity of output pulses to form the reference beam, thereby avoiding the need for a separate laser for the reference beam.

9 Claims, 3 Drawing Sheets

LASER RADAR WITH REFERENCE BEAM STORAGE

This invention relates to laser radar systems, and especially to pulsed coherent laser radar systems.

BACKGROUND OF THE INVENTION

Pulsed coherent laser radar systems generally use a single frequency laser to generate a sequence of short transmitter pulses. These are focused onto a distant target, and back-scattered light is collected by a receiving telescope mounted close to, or coaxial with, the transmitting optics. The received light is focused onto a photo-detector where it is mixed with a reference beam from a continuous wave laser, tuned to a frequency close to the transmitter frequency. Mixing of the two signals on the detector surface causes a photo-current to be produced at the difference frequency, which current is filtered and rectified. The rectified signal is a sequence of pulses, delayed with respect to transmitter pulses by the round trip transit time to and from the target. The delay time indicates the target range.

Coherent systems of this kind generally have an advantage in sensitivity over the systems using direct detection of the returned light, in which there is no reference beam and thus no interference pattern on the detector. A disadvantage of pulse coherent systems is the need to have a second laser generating a continuous wave reference beam. The power requirement of this laser is modest, a few milliwatts generally being sufficient, but it needs to be maintained at a frequency close to, but not identical to, the transmitter frequency. This is achieved either by continuously tuning one of the lasers with an electro-mechanical e.g. piezo-electric actuator to maintain a fixed frequency difference, or by locking the two lasers together, and generating a frequency-offset reference beam with an acousto-optic frequency shifter. Either approach requires an optical system and associated control systems of considerable complexity and high manufacturing cost. The optics are sensitive to thermal drift and mechanical vibration, and so are difficult to construct in a sufficiently rugged form for airborne environments.

SUMMARY OF THE INVENTION

The invention provides a laser radar system comprising a laser for producing optical pulses, a detector for receiving back-scattered radiation mixed with a reference laser beam, and a cavity arranged to produce a multiplicity of output pulses from respective pulses derived from the pulse laser, to form the reference laser beam.

The cavity provides a quasi-continuous output from a pulsed input and thus produces the reference beam without the need for a separate laser. The use of a cavity, according to an embodiment of the invention, results in cost savings flowing from the omission of the continuous laser, and avoids the engineering difficulties of locking lasers together or continuously tuning them to maintain a fixed frequency difference.

The cavity may include reflectors to produce multiple reflections to provide the multiplicity of output pulses. Thus, each pulse of the pulse laser may enter through one reflector, and the output pulse may leave through another reflector which also reflects the pulse around the cavity to produce a succession of output pulses. The cavity may be a medium such as a fibre or may be free space. In the case where the cavity is a length of fibre, a coupler may be provided to produce multiple divisions of each pulse in order to provide the multiplicity of output pulses.

BRIEF DESCRIPTION OF THE DRAWINGS

A laser radar system constructed in accordance with the invention will now be described, by way of example, with reference to the accompanying drawings in which.

DESCRIPTION OF THE PREFERRED EMBODIMENTS

Figure 1:
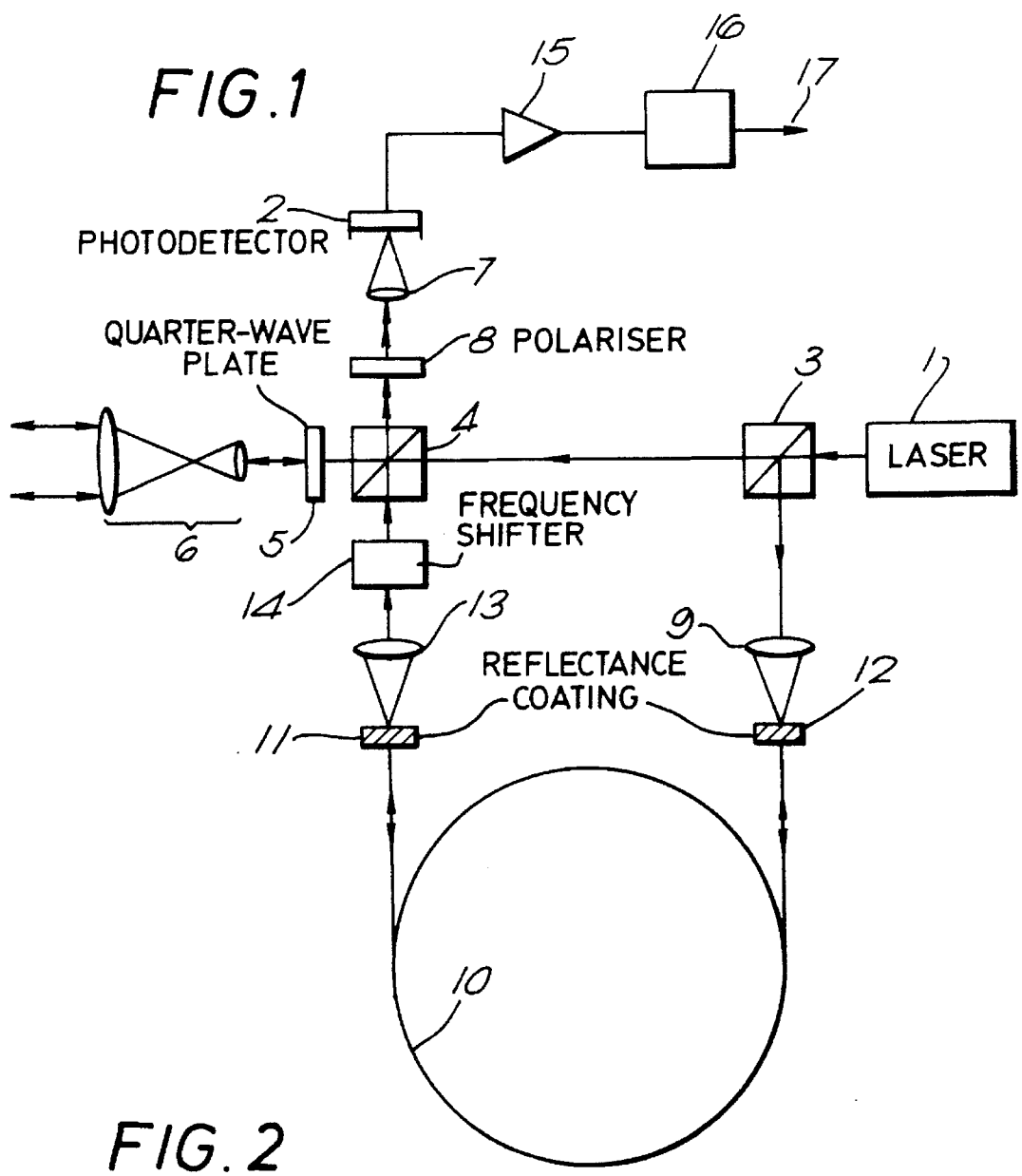
FIG. 1 is an optical diagram, partly in schematic form, of a laser radar system employing a fibre-optic cavity.

Referring to FIG. 1, a laser radar system employs a laser 1 for producing optical pulses, and a photo-detector 2 for receiving back-scattered radiation mixed with a reference laser beam. The laser is switched to produce a regular sequence of pulses at a single optical frequency. The switching may be accomplished by an internal Q-switch or externally.

Light from the laser 1 passes through a beam splitter 3 which transmits approximately 90% of the laser pulses to a polarising beam splitter 4 which is orientated with respect to the polarisation of the laser beam to pass the maximum amount of light. Light emerging from the beam splitter 4 passes through a quarter-wave plate 5 which converts it to circularly polarised light. The circularly polarised light is expanded by a telescope 6 which approximately focuses the beam on a distant target (not shown). A small proportion of the light randomly scattered by the target re-enters the telescope 6 and returns along its original path. On passing again through quarter-wave plate 5, it is converted to plane-polarised light with a polarisation orthogonal to that of the transmitted beam. This plane-polarised light is diverted by polarising beam splitter 4 and is focused by lens 7 and polariser 8 onto the surface of the photo-detector 2.

A reference beam also impinges onto the surface of photo-detector 2, and the wavefront of each beam is coincident as they impinge on the photo-detector 2. The reference frequency is at a fixed frequency difference with respect to the pulses from the laser 1, with the result that an interference pattern is formed on the photo-detector 2 which varies in intensity at the difference frequency. The amplitude of the alternating photo-current is dependent on the amount of scattering from the target. Each pulse will result in returns from targets at difference ranges over a period of time before the next pulse is transmitted.

Figure 2:
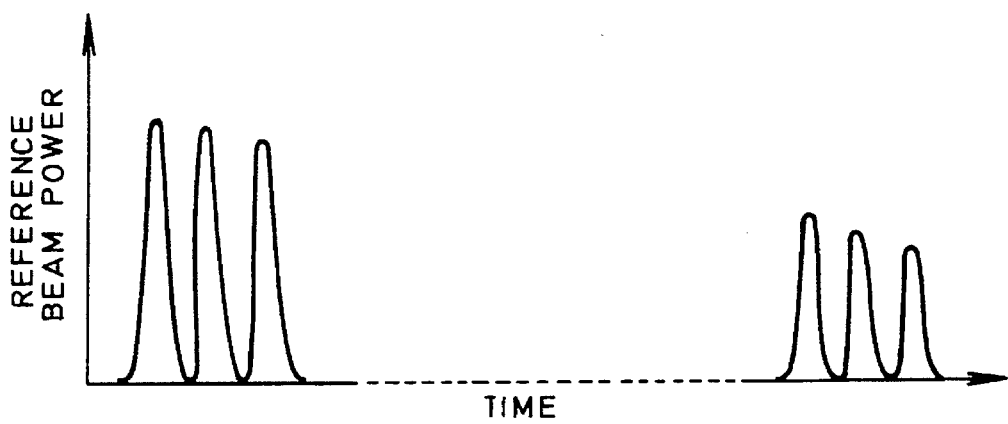
FIG. 2 illustrates the multiplicity of output pulses produced by a pulse from the pulse laser in FIG. 1.

In accordance with the invention, the reference beam consists of a multiplicity of output pulses from respective pulses derived from the laser 1. Thus, the fraction of each pulse which is reflected by the beam splitter 3 is focused by a lens 9 onto a single mode optical fibre 10 which is provided with reflectors in the form of high reflectance multi-layer dielectric coatings 11 and 12 at each end. The coatings will typically have 98% reflectance and 1.5% transmittance. The fibre 10 has a length such that the time required for light to travel from the input to the far end and back is longer than the length of a laser pulse. Pulses travelling along the fibre are therefore spatially separated from each other. The fibre 10 may be wound on a circular former in such a way that no additional stress is placed on the fibre other than due to bending. Under these circumstances, the fibre acts like a birefringent plate so that light entering with polarisation parallel to the ordinary or extraordinary ray directions, emerges from the far end of the fibre with the same polarisation. Light reaching the far end of the fibre is partially transmitted by the high reflectance coating 11, producing a pulse delayed with respect to the transmitted pulse by the time delay in the fibre, and with the same direction of polarisation as the input pulse. The pulse bounces back and forth between the fibre ends, producing an output pulse at each bounce. The output from the fibre therefore consists of a sequence of output pulses of gradually decreasing intensity as shown in FIG. 2. This sequence of output pulses is collimated by a lens 13 and then passes through an acousto-optic frequency shifter 14 which changes the frequency of the light by a small amount. Since the polarisation of the reference beam is the same as that of the main beam pulses, the reference beam is passed by the polarising beam splitter 4.

The output of the photo-detector 2 is amplified in amplifier 15 and filtered in filter 16 to remove the low frequency components produced by the reference beam pulse profile. The resulting output 17 consists of a sequence of r.f. pulses at the pulse frequency of the laser, but delayed with respect to the transmitter pulses by the round trip transit time to and from the target. The r.f. frequency will be equal to the frequency shift applied to the reference beam by the frequency shifter 14 plus any Doppler shift due to relative motion between the transmitter/receiver and the target.

The reference beam is not a continuous wave, but a sequence multiplicity of output pulses, so that the r.f. signal amplitude emerging from the detector will only be a maximum when the return and reference pulses overlap. This occurs when the round trip transit time to the target is (0.5+m) times the round trip transit time through the fibre 10, where m is zero or 2 positive integer. Under these conditions, the signal and reference pulses completely overlap, producing maximum output. At other ranges, the r.f. output will be lower because there will only be partial overlap between the return and the reference pulses. There will therefore be a periodic variation in the signal strength with range. This is unlikely to be of much practical importance, however, because the signal strength in coherent detection systems varies randomly over a wide range as a result of laser speckle effects and atmospheric turbulence.

In a typical system, the pulses from the laser 1 may be of 0.5 microsecond duration, with a repetition frequency of 500 pulses per second. A typical fibre length for this pulse length would be between 50 and 100 meters to ensure that the pulses do not overlap. Such a fibre could be wound on a circular former typically having a 100 to 200 mm diameter. The acousto-optic frequency shifter could shift the frequency by a typical amount of 100 MHz, and a Bragg cell could be used for this purpose.

While the system described operates on the heterodyne detection principle, the invention is also applicable to the homodyne detection principle. An alternating current from the photo-detector 2 is easier to process, but there will usually be a Doppler frequency between the laser system and the target to provide such an a.c. signal. The output 17 may be passed to Doppler filter banks or analysed with an FFT (Fast Fourier Transform).

The system is applicable for obstacle detection and wind profiling, ie. producing a velocity profile of the atmosphere to detect turbulence.

Figure 3:
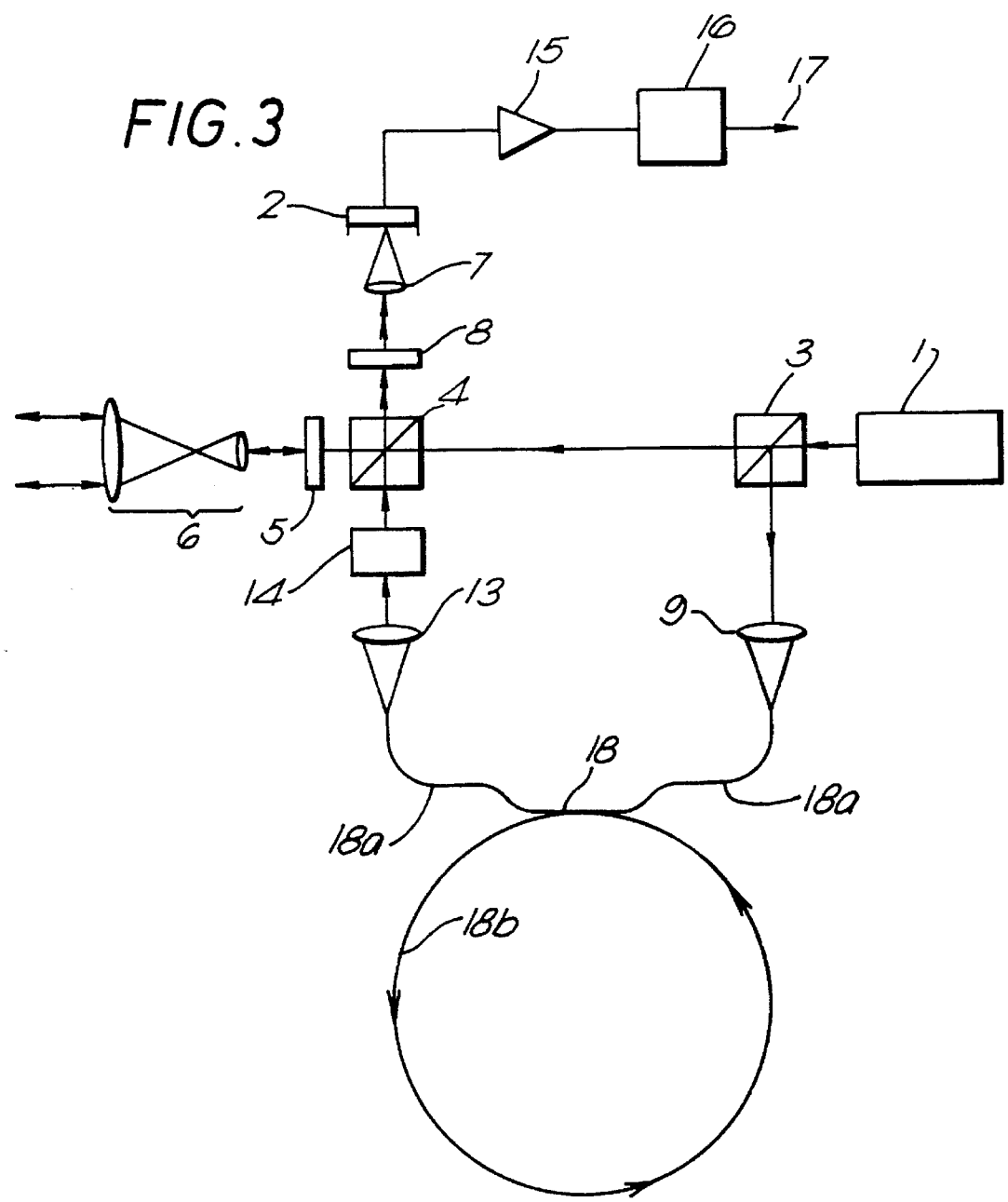
FIG. 3 is an optical diagram, partly in schematic form, of a laser radar system employing another type of fibre-optic cavity.
Figure 3A:
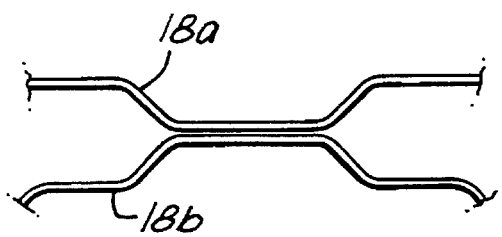
FIG. 3a shows the coupling of the fibre-optic cavity of FIG. 3 in enlarged form.

Referring to FIGS. 3 and 3a, the laser radar system of FIGS. 1 and 2 may be modified so as to produce the multiplicity of output pulses, not from multiple reflections from the reflectors 11, 12 but rather by using a coupler 18, shown in enlarged form in FIG. 3a. The other parts of the laser radar system of FIG. 3 are the same as that of FIG. 1, and hence will not be described. The coupler is a four-port coupler with weak coupling between, on the one hand, fibre 18a onto one end of which each pulse from the laser 1 is focused by the lens 9 and from the other end of which radiation is collimated by lens 13 and, on the other hand, a closed ring or loop of optical fibre 18b. The degree of coupling is controlled by the spacing between the fibres in the coupling region. Each pulse from the beam splitter 3 passes directly to collimating lens 13 but a proportion of the power is coupled into the loop of optical fibre 18b. This travels around the ring and a proportion is coupled back into the fibre 18a on each revolution. In this way successive pulses are produced from each pulse derived from the laser 1 via the beam splitter 3. Since the pulse travels once around the loop between each output pulse, to produce the same spacing (FIG. 2) as for the FIG. 1 embodiment, it would be necessary for the loop of optical fibre 18b to be twice the length of the ring 10 of FIG. 1.

Figure 4:
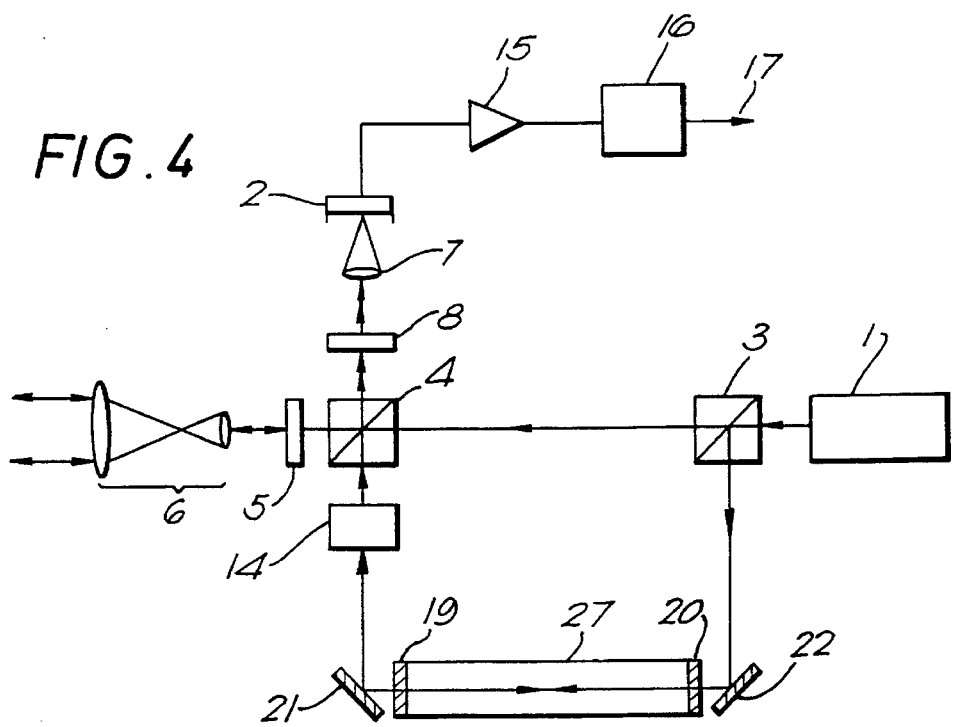
FIG. 4 is an optical diagram, partly in schematic form, of a laser radar system using a linear cavity.
Figure 5:
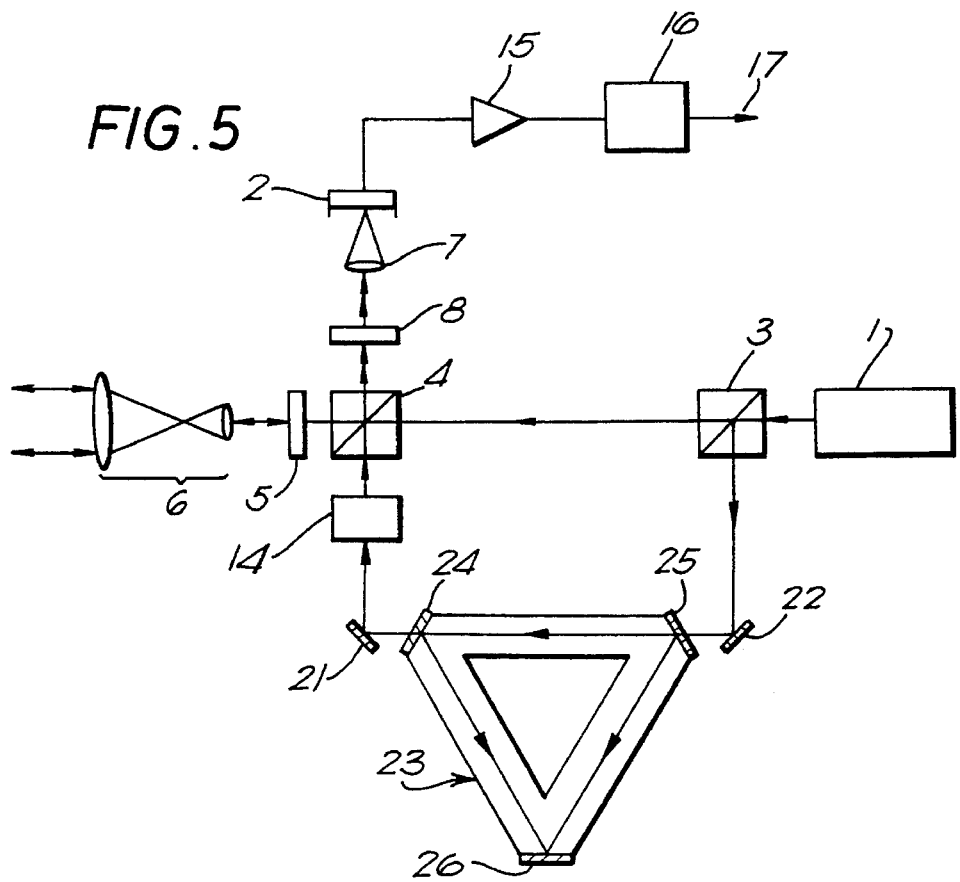
FIG. 5 is an optical diagram, partly in schematic form, of a laser radar system employing a reflective ring cavity.

Referring to FIGS. 4 and 5, the fibre-optic cavity of FIGS. 1 and 3 may be replaced by a cavity of free space together with reflectors to provide the multiplicity of output pulses from the pulses derived from the pulse laser 1. In the arrangement of FIG. 4, a linear cavity 27 is used, and successive output pulses are produced by reflections between reflectors 19, 20. Both reflectors 19, 20 are partially transmitting to allow entry of the input pulse and exit of the output pulses. Reflectors 21 and 22 reflect each pulse derived from the laser 1 via the beam splitter 3 into the cavity 27 and back into the acousto-optic frequency shifter 14. In other respects, the system of FIG. 4 is the same as that of FIGS. 1 and 3.

As another alternative, a ring cavity 23 may be used (FIG. 5). Each pulse derived from laser 1 by means of beam splitter 3 is reflected by reflector 22 through reflector 25, which is partially transmitting, and through reflector 24 (also partially transmitting) to be reflected by reflector 21 onto acousto-optic phase shifter 14. At the reflector 24, most of the power of each pulse is reflected to reflector 26 and thence back to reflector 25 and reflector 24, and so on, to produce the multiplicity of output pulses. In this case, pulses partially transmitted by reflector 25 cannot be retro-reflected into the laser, as they can in FIG. 4, which could be an advantage in certain applications.

An advantage of the arrangements of FIG. 4 and FIG. 5 compared to those of FIGS. 1 and FIG. 3 is that an evacuated cavity can be used, thus eliminating attenuation due to materials and permitting operation at wavelengths, such as 10.6 micrometers, which are attenuated in optical materials. It is easy to arrange that the length of the cavity traversed between successive output pulses to be less than the pulse length, making the output pulses more quasi-continuous. It is necessary to set the cavity length with precision in this case, to ensure that the wavefronts of successive pulses are in phase with each other in the overlap region.

Typical laser radars for obstacle avoidance and wind sensing require maximum ranges in the region of 3 to 5 kilometers. The maximum round trip length will therefore be 6 to 10 kilometers. Wavelengths of particular interest are in the eye safe region beyond 1500 nm. These include 2.0 to 2.1 micrometers for thulium-YAG and thulium-holmium-YAG lasers and 10.6 micrometers for $CO_2$. For 2 micrometers, fluoride fibres could be expected to have low scattering.

For low loss materials, the attenuation of the reference pulse amplitude on successive output pulses is dominated by reflectors/coupler losses. Assuming reflectors/couplers with 98% reflectivity/containment, the reference pulse amplitude will be reduced to about 10% of initial amplitude after a time delay equivalent to a 3 km range. This should provide sufficient reference beam power to achieve shot-noise limited receiver sensitivity at maximum range.

Considering the case of the thulium-YAG laser outputting 1 mJ pulses, 0.5 microseconds long, the peak transmitter power may be approximately 2 kW. If 10% of the power diverted to the reference beam, and 5% is admitted into the cavity, the circulating power in the cavity is 3 W. Assuming that 1.5% of the power is tapped off onto the detector at each exit pulse, and that 70% of this reaches the detector, the reference beam power should be about 30mW initially, reducing to 3 mW at a 3 km range. This should be sufficient to achieve shot-noise limited sensitivity with an optimally designed receiver.

The coherent laser radar using a separate laser to provide the reference beam requires both transmitter and reference lasers to operate at a single frequency. If the transmitter laser provides both signal and reference beams, this requirement is no longer necessary, and lasers operating at multiple frequencies can be used. Multi-mode lasers offer considerable practical advantages in terms of output power and efficiency, and in terms of ease of adjustment and low sensitivity to temperature and vibration. Using the cavity, all laser frequencies are present in the reference beam pulses applied to the photo-detector. Components of frequencies are available in the reference beam at all signal frequencies, and so all signal components are coherently detected.

We claim:

1. A laser radar system, comprising:

a pulse laser for producing successive optical pulses;

a detector, coupled to said pulse laser, for receiving back-scattered radiation mixed with a reference laser beam, a frequency shift existing between the back-scattered radiation and the reference laser beam to allow heterodyne detection by said detector;

a cavity, coupled to said pulse laser and said detector, for producing a multiplicity of output pulses; and first and second reflectors optically coupled to said cavity, each pulse of the successive optical pulses entering said cavity through said first reflector and a corresponding output pulse leaving said cavity through said second reflector, said reflectors producing multiple reflections within said cavity from each pulse of the successive optical pulses produced by the pulse laser, the output pulses of said cavity resulting from repeated transversals within said cavity by each pulse of the successive optical pulses, to form the reference laser beam.

2. A laser radar system as claimed in claim 1, wherein said first and second reflectors are parallel to each other.

3. A laser radar system as claimed in claim 1, wherein further reflectors are arranged to reflect the optical pulses around a closed path.

4. A laser radar as claimed in claim 1, further comprising a frequency shifter for shifting the frequency of the reference laser beam.

5. A laser radar as claimed in claim 1 wherein said cavity comprises a loop of optical fibre.

6. A laser radar system, comprising:

a pulse laser for producing successive optical pulses;

a detector, coupled to said pulse laser, for receiving back-scattered radiation mixed with a reference laser beam, a frequency shift existing between the back-scattered radiation and the reference laser beam to allow heterodyne detection by said detector;

a coupler; and a cavity comprising a loop of optical fiber, coupled to said pulse laser and said detector by said coupler, for producing a multiplicity of output pulses, the output pulses resulting from repeated transversals within said cavity by each pulse of the successive optical pulses, to form the reference laser beam.

7. A laser radar system as claimed in claim 6, wherein said coupler is a four port coupler having first and second ports interacting with said loop of optical fibre, and third and fourth ports, said third port interacting with an input fibre for receiving successive optical pulses produced by the pulse laser, and said fourth port interacting with an output fibre for outputting the multiplicity of output pulses.

8. A laser radar as claimed in claim 6, further comprising a frequency shifter for shifting the frequency of the reference laser beam.

9. A laser radar system, comprising:

a pulse laser for producing successive optical pulses along an optical path;

beam splitting means arranged in the optical path of the optical pulses for partially transmitting the optical pulses in a first partial stream of optical pulses and partially reflecting the optical pulses in a second stream of partial optical pulses, one of the streams of partial optical pulses being for transmission from said laser radar system;

a detector for receiving back-scattered radiation mixed with a reference laser beam, a frequency shift existing between the back-scattered radiation and the reference laser beam to allow heterodyne detection by said detector; and a cavity comprising a loop of optical fiber arranged in an optical path of the other of said streams of partial optical pulses and coupled to said detector for producing a multiplicity of output pulses, the output pulses resulting from repeated transversals within said cavity by each pulse of the other stream of partial optical pulses to form the reference laser beam.

\* \* \* \* \*